J. LACHANCE.
WAVE MOTOR.
APPLICATION FILED SEPT. 28, 1914.
1,154,033.
Patented Sept. 21, 1915.
2 SHEETS—SHEET 1.
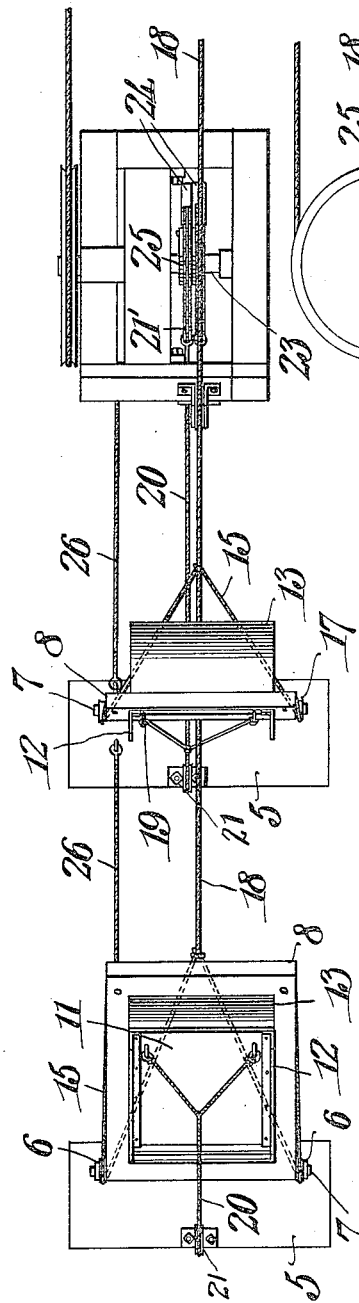
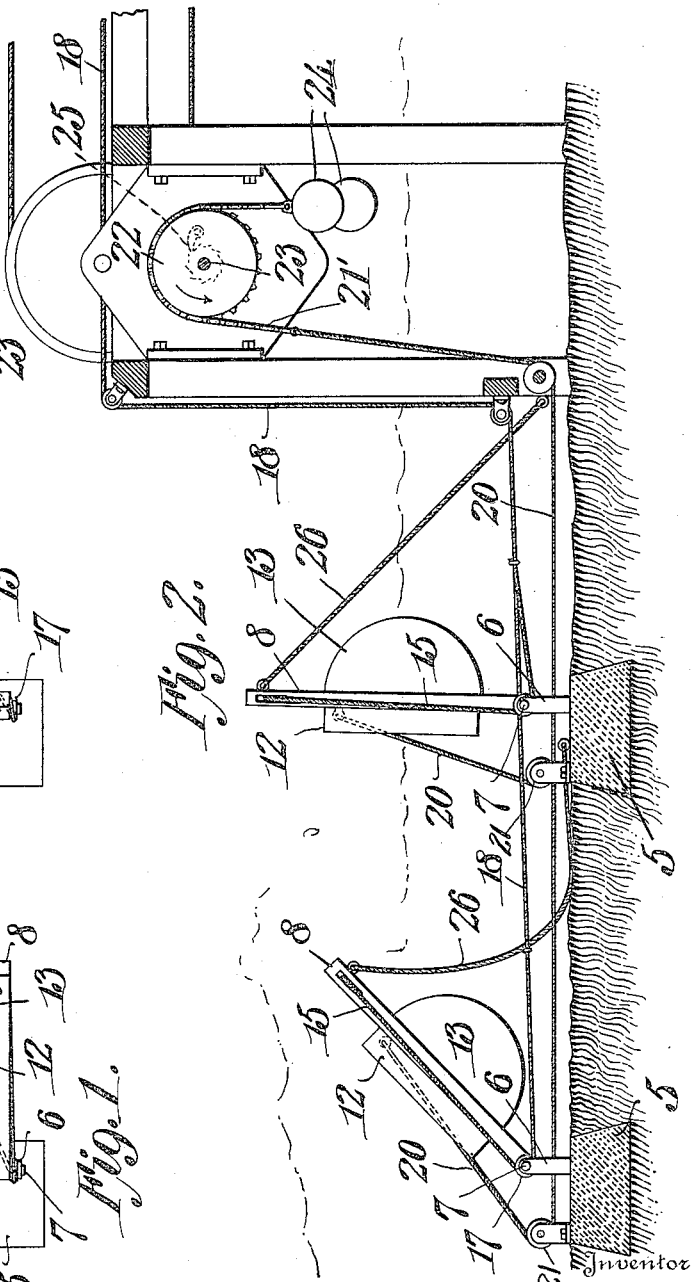
Joseph Lachance.

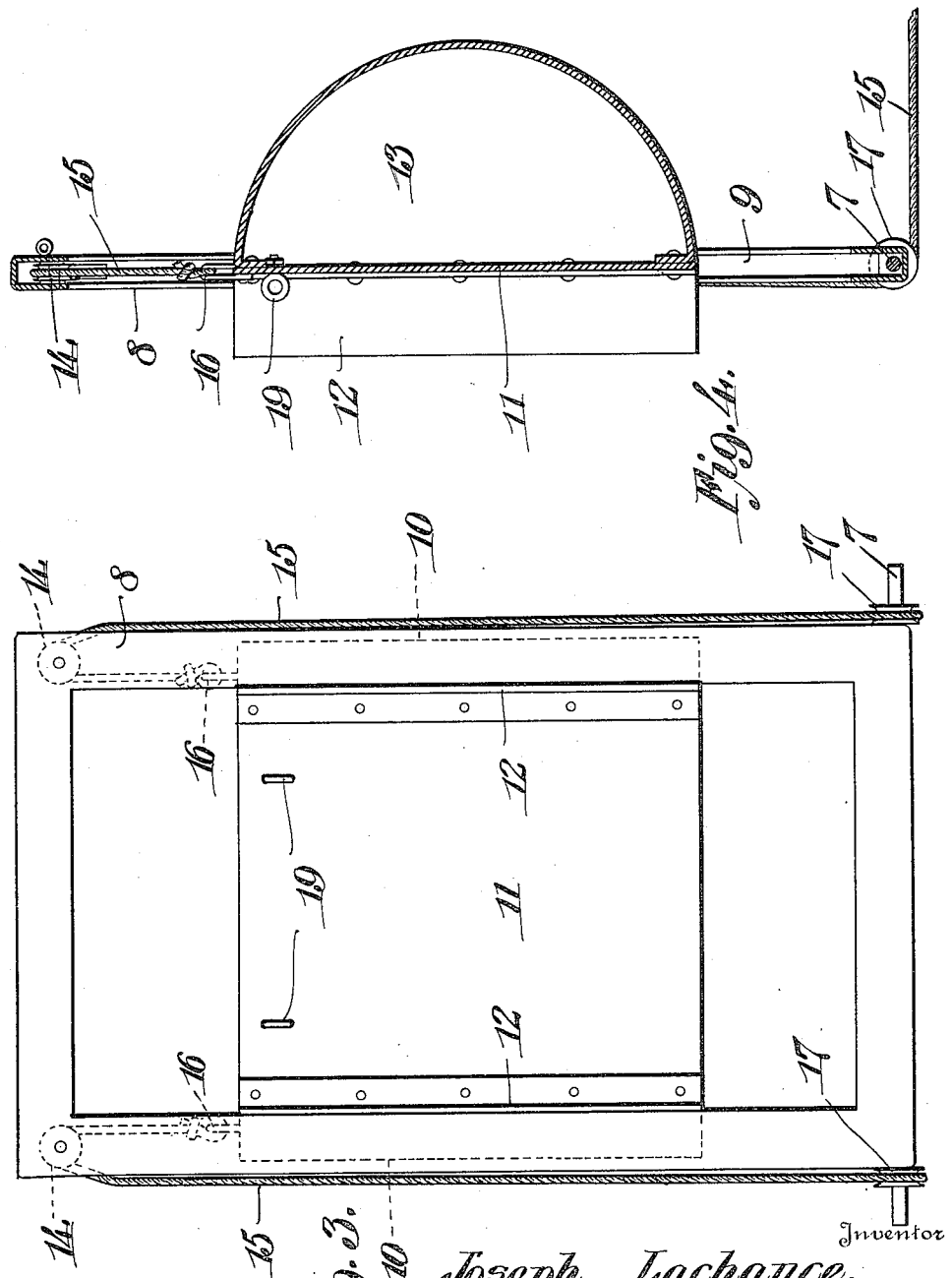

UNITED STATES PATENT OFFICE.

JOSEPH LACHANCE, OF LOS ANGELES, CALIFORNIA.

WAVE-MOTOR.

1,154,033.  Specification of Letters Patent.  Patented Sept. 21, 1915.

Application filed September 28, 1914. Serial No. 863,980.

*To all whom it may concern:*

Be it known that I, JOSEPH LACHANCE, a citizen of the United States, residing at Los Angeles, county of Los Angeles, and State of California, have invented certain new and useful Improvements in Wave-Motors, of which the following is a specification.

This invention relates to wave motors, and has for its primary object to provide a simple but thoroughly efficient and practical device for utilizing the power in waves of a stream, lake or ocean.

A further object of my invention is to provide a device of this character which will derive the greatest amount of power from the waves, which is easy and cheap in installation, and which will not readily become deranged.

A still further and more particular object of my invention is to provide a wave motor wherein the power collecting elements may be easily adjusted from the shore or power house to render the same most efficient according to the ebb and flow of the tides.

Other objects will appear hereinafter.

With these objects in view my invention consists in the novel combination and arrangement of parts, all as will be described hereinafter and particularly pointed out in the claims.

My invention will be more readily understood with reference to the accompanying drawings, wherein a practical embodiment of the invention is illustrated, and in which—

Figure 1 is a plan view of the wave motor in its simplest form, Fig. 2 is a side elevation of the device, parts being shown in section, Fig. 3 is an enlarged detail elevation of one of the improved power collecting vanes forming a part of my invention, and Fig. 4 is a vertical section taken through the vane illustrated in Fig. 3.

In the installation of a wave motor of the character under consideration it may be found expedient to resort to different arrangements according to the nature of the water and shore where it is desired to locate the device, that is, the power collecting units may be located adjacent the shore, or they may be efficiently positioned upon the piling about a pier; the device in the present illustration being shown located in comparatively shallow water near a river, lake or ocean shore.

In carrying out the invention I employ a number of power collecting vanes, and in order that each vane may be held securely against displacement and to resist the power of the waves in a storm, a base 5, formed of concrete, cement or other suitable material, is provided. Extending vertically from each base 5 is a pair of alined brackets 6 within which the trunnions 7 of vanes 8 are adapted to be rotatably mounted. The vanes are preferably in alinement with each other and are spaced apart a distance suitable to allow of free movement of each vane without interference from the adjacent vane. Each vane comprises a substantially rectangular frame, having at its opposite longitudinal sides grooves 9 for the reception of the outer edges 10 of slidable gates 11. The gates 11 are provided adjacent their opposite longitudinal edges with forwardly extending flanges 12 to prevent the bulk of an incoming wave from wasting over the edges thereof, while a buoyant member 13 is formed upon the opposite side of the gate.

From the construction of the device so far described, it is obvious that the frames 8 will oscillate by the force of the waves, the buoyant member 13 upon the gate of each vane holding the vanes in vertical or operative position.

Secured upon the upper ends of the frames and communicating with the upper ends of the guides thereof is a pair of pulleys 14, over which cables 15 are adapted to pass to be connected as at 16 with the upper end of the gate 11, and to extend outwardly and downwardly therefrom passing over guide wheels or pulleys 17 mounted adjacent the lower end, preferably upon the pintles 7, of the separate frames. The cables 15 are connected to a common cable 18 leading to the shore, power house or other convenient place for operation.

Upon the forward face of each of the slidable gates 11 is secured a pair of eyes or other suitable securing elements 19, to which is secured one end of a power cable 20.

This cable extends forwardly from each of the vanes 8 and passes over a guide wheel 21 in advance thereof, then extending rearwardly to be connected to a chain 21' passing over a sprocket 22 mounted upon a shaft 23 of a suitable driven mechanism. This driven mechanism, forming no part of my invention, may be of any preferred construction, a sprocket for each of the power cables 20 being illustrated in the present instance in order that a continuous rotary movement may be imparted to the shaft 23. Weights 24 are secured to the ends of the chains 21' beyond each sprocket wheel to help restore the several vanes to initial or operative position after the wave operating the same has passed or receded, the ratchet mechanism illustrated conventionally at 25 permitting of the sprocket 22 idling in a reverse direction.

It may be found desirable to locate the driven mechanism above briefly referred to upon the shore or pier, it being shown in the present instance for convenience in illustration closely related to the power vanes.

It will be readily understood that upon contact with the first of the vertically disposed vanes the incoming wave will force the same to rock rearwardly upon its pintles to substantially the position shown in Fig. 2, whereupon the power cable 20 will be drawn and the shaft 23 rotated in the direction indicated by the arrow. As the wave passes on to the following vanes a similar action will take place, and it will be readily understood that with a series of vanes so arranged a continuous movement of the shaft 23 will be had. Upon passing the various vanes, the weights 24, together with the buoyancy of the floats 13 upon each of the gates, will restore the vanes to initial or operative position once more. Inasmuch as the vanes themselves are fixed upon the supports provided it is necessary that some means be provided to compensate for the ebb and flow of the tides, and it is apparent that by operating the cable 18 the gates 11 which constitute the impact elements of the various vanes may be raised or lowered accordingly with the rise and fall of the water. To prevent the vanes from swinging too far forwardly, cables or ropes 26 are provided, each being connected at one end to the frames 8 and at the opposite end to some point in the rear of its respective vane.

I claim:—

1. In a wave motor, a driven mechanism, a plurality of vanes each comprising a frame mounted for oscillatory movement, a buoyant gate slidably mounted in each of said frames, and a connection between each of said gates and said driven mechanism, substantially as described.

2. In a wave motor, a driven mechanism, a plurality of vanes each comprising a frame pivoted at its lower end of oscillatory movement, a buoyant gate slidably mounted in each of said frames, and a power cable connecting each of said gates with said driven mechanism, substantially as described.

3. In a wave motor, a driven mechanism, a plurality of vanes each comprising a frame pivoted at one end for oscillatory movement, a buoyant gate mounted in each of said frames for sliding movement toward and away from said pivoted ends, a pulley adjacent the pivoted end of each of said frames, and a flexible cable connected at one end to each of said gates and passing over said pulleys and connected at its opposite end to said driven mechanism, substantially as described.

4. A wave motor comprising a plurality of vanes mounted for oscillation and connected to driven mechanism, each of said vanes comprising a frame pivoted at its lower end, a pair of vertically extending guides on each of said frames, pulleys adjacent the upper and lower ends of said frames, a gate for each of said frames adapted to slide within said guides, and a float mounted upon each gate, and cables connected to the upper end of each of said gates and passing over said pulleys whereby said gates may be slid within the said guides, substantially as described.

5. In a wave motor, a driven mechanism, a plurality of vanes mounted for oscillatory movement and connected to operate said driven mechanism, each of said vanes comprising a rectangular frame provided at its lower end with pintles for pivotally mounting the same, pulleys on said pintles, said frames being provided with vertically extending guides, pulleys adjacent the upper ends of said frames and communicating with said guides, gates slidably mounted within said guides, and cables connected to the upper end of each of said gates and passing over said pulleys for sliding said gates, substantially as described.

6. In a wave motor, a driven mechanism, a plurality of vanes mounted for oscillatory movement and connected to operate said driven mechanism, each of said vanes comprising a rectangular frame provided at its lower end with pintles for pivotally mounting the same, pulleys on said pintles, said frames being provided with vertically extending guides, pulleys adjacent the upper ends of said frames and communicating with said guides, a gate provided with a buoyant member slidably mounted within the guides of each vane, and cables connected to the upper end of each of said gates and passing over said pulleys to be connected to a common cable, substantially as described.

7. In a wave motor, a driven mechanism, a plurality of vanes each comprising a rectangular frame pivoted at one end for oscillatory movement, a gate slidably mounted upon each of said frames and means for sliding said gates, and a connection between said gates and said driven mechanism whereby the latter will be operated upon movement of the former, substantially as described.

In testimony whereof I have signed my name to this specification in the presence of two subscribing witnesses.

JOSEPH LACHANCE.

Witnesses:
 MARY E. MAST,
 MARTHA C. MAST.

Copies of this patent may be obtained for five cents each, by addressing the "Commissioner of Patents, Washington, D. C."